US012583419B2

(12) United States Patent
Yoon et al.

(10) Patent No.: US 12,583,419 B2
(45) Date of Patent: Mar. 24, 2026

(54) CLEANING APPARATUS

(71) Applicants: HYUNDAI MOTOR COMPANY, Seoul (KR); KIA CORPORATION, Seoul (KR)

(72) Inventors: Hyun Woo Yoon, Hwaseong-si (KR); Sung Min Yang, Incheon (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 405 days.

(21) Appl. No.: 18/212,378

(22) Filed: Jun. 21, 2023

(65) Prior Publication Data

US 2024/0190391 A1     Jun. 13, 2024

(30) Foreign Application Priority Data

Dec. 13, 2022     (KR) ........................ 10-2022-0173230

(51) Int. Cl.
| | |
|---|---|
| *B60S 1/54* | (2006.01) |
| *B05B 1/02* | (2006.01) |
| *B60S 1/56* | (2006.01) |
| *G02B 27/00* | (2006.01) |
| *B60S 1/52* | (2006.01) |

(52) U.S. Cl.
CPC .................. *B60S 1/54* (2013.01); *B05B 1/02* (2013.01); *B60S 1/56* (2013.01); *G02B 27/0006* (2013.01); *B60S 1/52* (2013.01)

(58) Field of Classification Search
CPC ..... B60S 1/52; B60S 1/56; B60S 1/54; G02B 27/0006; B05B 1/02
See application file for complete search history.

(56) References Cited

U.S. PATENT DOCUMENTS

| | | | |
|---|---|---|---|
| 10,252,703 B2 * | 4/2019 | Ina .......................... | B60S 1/528 |
| 10,661,761 B2 | 5/2020 | Kimura et al. | |
| 11,155,244 B2 | 10/2021 | Ichikawa et al. | |
| 11,273,798 B2 | 3/2022 | Giraud | |
| 11,505,163 B2 | 11/2022 | Kimura et al. | |
| 2015/0353024 A1 * | 12/2015 | Cooper ................... | B60R 11/04 |
| | | | 348/148 |
| 2018/0186341 A1 | 7/2018 | Kimura et al. | |
| 2018/0194330 A1 | 7/2018 | Ichikawa et al. | |
| 2018/0345917 A1 * | 12/2018 | Yamamoto .............. | B60R 11/04 |
| 2019/0106086 A1 | 4/2019 | Giraud | |
| 2020/0262397 A1 | 8/2020 | Kimura et al. | |
| 2021/0086727 A1 * | 3/2021 | Bopp ........................ | B08B 3/02 |
| 2021/0362689 A1 | 11/2021 | Ichikawa et al. | |
| 2022/0057509 A1 * | 2/2022 | Sykula ................... | G01S 7/4043 |

(Continued)

FOREIGN PATENT DOCUMENTS

| | | | |
|---|---|---|---|
| CN | 218141338 U | * | 12/2022 |
| JP | 6641369 B2 | | 1/2020 |
| JP | 6846346 B2 | | 3/2021 |

(Continued)

*Primary Examiner* — Benjamin L Osterhout
(74) *Attorney, Agent, or Firm* — Lempia Summerfield Katz LLC

(57) ABSTRACT

A cleaning apparatus and, more particularly, a sensor cleaning apparatus. The cleaning apparatus includes a nozzle configured to receive a fluid and inject the fluid to a subject. The nozzle is configured such that a cross-section thereof changes in a flow direction of the fluid.

19 Claims, 5 Drawing Sheets

(56) References Cited

U.S. PATENT DOCUMENTS

2022/0144217 A1 *    5/2022   Kline .................... F16K 11/044

FOREIGN PATENT DOCUMENTS

| KR | 20180136981 | A |   | 12/2018 | |
|----|-------------|---|---|---------|--|
| KR | 20230053610 | A | * | 4/2023 | ................ B60S 1/56 |
| TW | 201023986 | A | * | 7/2010 | |
| WO | WO-2014006500 | A2 | * | 1/2014 | ............. H04N 23/51 |
| WO | WO-2014017015 | A1 | * | 1/2014 | ......... G02B 27/0006 |
| WO | WO-2017002877 | A1 | * | 1/2017 | ................ B60S 1/54 |
| WO | WO-2017002878 | A1 | * | 1/2017 | ................ B60S 1/56 |
| WO | WO-2018131289 | A1 | * | 7/2018 | ............. B60R 11/02 |
| WO | WO-2020158938 | A1 | * | 8/2020 | ........... H04N 23/811 |
| WO | WO-2021151698 | A1 | * | 8/2021 | ................ B60S 3/04 |

* cited by examiner

CLEANING APPARATUS

CROSS REFERENCE TO RELATED APPLICATION

The present application claims priority to Korean Patent Application No. 10-2022-0173230, filed Dec. 13, 2022, the entire contents of which are incorporated herein by reference.

BACKGROUND

Field

The present disclosure relates to a cleaning apparatus and, more particularly, to a sensor cleaning apparatus.

Description of the Related Art

Recently, vehicles are provided with a driver assistance system to assist a driver of a vehicle to safely drive in various driving situations. In addition to the driver assistance system, there is active research and development focused on autonomous vehicles that can drive themselves without requiring driver intervention.

In such a driver assistance system or an autonomous vehicle, various types of environmental sensors that may sense the surrounding environment in a variety of manners are mounted on a vehicle. The environmental sensors mounted on a vehicle may include a radar, a light detection and ranging (LiDAR) sensor, a camera, and the like.

Because these sensors are typically mounted on the exterior of the vehicle, sensing portions thereof are easily susceptible to becoming soiled by foreign matter, such as dust, rain, or snow. In order to maintain sensor performance, such sensors must stay clean up to a certain level, so vehicles are provided with a sensor cleaning system that may clean the sensor when the sensing portion is soiled.

The foregoing is intended merely to aid in the understanding of the background of the present disclosure and is not intended to mean that the present disclosure falls within the purview of the related art that is already known to those having ordinary skill in the art.

SUMMARY

The present disclosure has been made keeping in mind the above problems occurring in the related art, and the present disclosure is intended to propose a cleaning apparatus that may effectively clean an environmental sensor, in particular, a camera of a vehicle.

The objective of the present disclosure is not limited to the aforementioned description, and other objectives not explicitly disclosed herein should be clearly understood by those having ordinary skill in in the art from the description provided hereinafter.

In order to achieve at least one of the above objectives and carry out following characteristic functions of the present disclosure, the present disclosure has following features.

According to some embodiments of the present disclosure, a cleaning apparatus may include a nozzle configured to receive a fluid and inject the fluid to a subject. The nozzle may be configured such that a cross-section thereof changes in a flow direction of the fluid.

According to some embodiments of the present disclosure, a cleaning apparatus may include a nozzle configured to receive fluid and inject the fluid to a camera. The nozzle may be configured to inject the fluid at a position behind a lens of the camera.

According to the present disclosure, the cleaning apparatus is designed with a structure that enables effective cleaning of an environmental sensor, particularly a camera used in a vehicle.

Effects obtainable from the present disclosure are not limited to the aforementioned effects, and other effects not explicitly disclosed herein should be clearly understood by those having ordinary skill in in the art from the description provided hereinafter.

BRIEF DESCRIPTION OF THE DRAWINGS

The above and other objectives, features, and other advantages of the present disclosure should be more clearly understood from the following detailed description when taken in conjunction with the accompanying drawings, in which:

FIG. 3 illustrates a cleaning apparatus according to an embodiment of the present disclosure;

DETAILED DESCRIPTION

Figure 1:
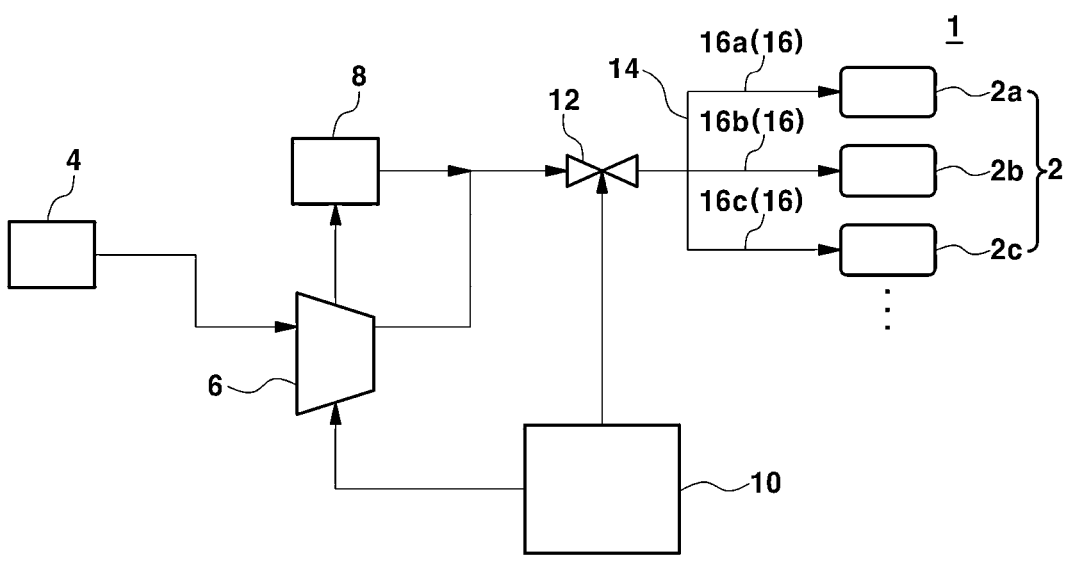
FIG. 1 is a block diagram illustrating a sensor cleaning system using compressed air in one embodiment of the present disclosure.

Specific structural and functional descriptions of embodiments of the present disclosure disclosed herein are only for illustrative purposes of embodiments of the present disclosure. The present disclosure may be embodied in many different forms without departing from the spirit and significant characteristics of the present disclosure. In addition, the present disclosure is intended to cover not only the exemplary embodiments, but also various alternatives, modifications, equivalents, and other embodiments that may be included within the spirit and scope of the present disclosure.

Although the terms "first," "second," and the like, may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

It should be understood that when an element is referred to as being "coupled," "connected," or "linked" to another element, it can be directly coupled or connected to the other element or intervening elements may be present therebetween. In contrast, it should be understood that when an element is referred to as being "directly coupled," "directly connected," or "directly connected" to another element, there are no intervening elements present. Other expressions that explain the relationship between elements, such as "between," "directly between," "adjacent to," and "directly adjacent to" should be construed in the same way.

When a component, device, element, or the like of the present disclosure is described as having a purpose or performing an operation, function, or the like, the component, device, or element should be considered herein as being "configured to" meet that purpose or to perform that operation or function.

Throughout the specification, the same reference numerals refer to the same or like parts. The terminologies used herein are for the purpose of describing particular embodiments only and are not intended to limit the present disclosure. As used herein, singular forms are intended to include plural forms as well, unless not explicitly stated to the contrary unless the context clearly indicates otherwise. It should be further understood that the terms "comprise," "include," "have," etc., when used in this specification, specify the presence of stated features, integers, steps, operations, elements, components, and/or combinations thereof but do not preclude the presence or addition of one or more other features, integers, steps, operations, elements, components, and/or combinations thereof.

Hereinafter, the present disclosure is described in detail with reference to the accompanying drawings.

As described above, in order to maintain the performance of environmental sensors detecting the surrounding environment of a vehicle, it is required to periodically clean the surface of the sensors. For example, an environmental sensor may be contaminated by solids, such as dust and sand, or may be stained by liquids, such as raindrops and snow during precipitation.

In particular, in an active autonomous the vehicle is driven based on information regarding the surrounding environment, such as traffic lights, pedestrians, road types, buildings, and surrounding vehicles recognized by environmental sensors. When the surfaces of the environmental sensors are contaminated, it is impossible to recognize the surrounding environment and active autonomous driving is impossible. Accordingly, a sensor cleaning system of a vehicle performs an important function of enabling driving by helping the environmental sensors to clearly recognize the surrounding environment without distortion and removing contaminants on the surfaces of the sensors.

Cleaning of such an environmental sensor may be performed using washer fluid or high-pressure air. In the former, the sensor may be washed using washer fluid and moisture on the sensor may be removed by injecting air. In the latter, foreign matter on the sensor surface may be removed by only spraying high-pressure air.

Figure 2:
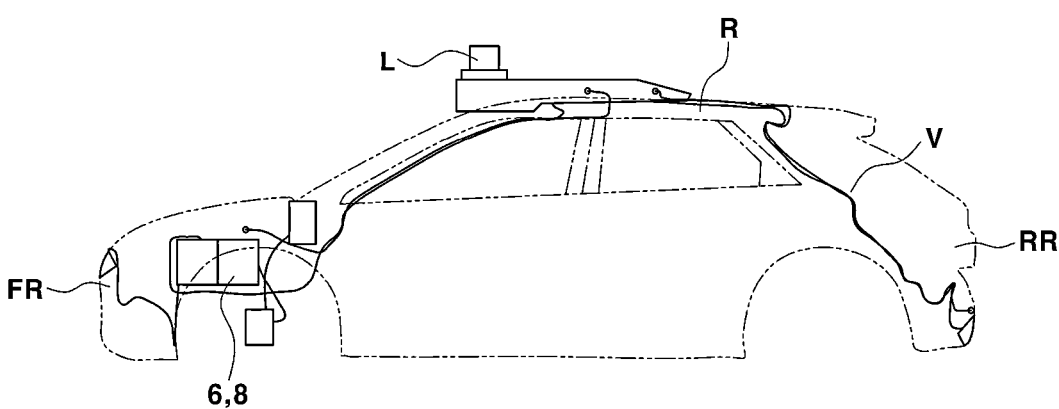
FIG. 2 is a schematic diagram illustrating a layout of environmental sensors and a sensor cleaning system in a vehicle in one embodiment of the present disclosure.

A sensor cleaning system using the latter so-called air cleaning method, which cleans the environmental sensor by injecting compressed air, is described with reference to FIGS. 1 and 2. An air cleaning system 1 of the sensor cleaning system is configured to clean environmental sensors 2 using compressed air. The environmental sensors 2 may include sensing devices, such as a LiDAR sensor, a radar, and a camera, and may be disposed on a front part "FR", a rear part "RR", side parts, a roof "R", and the like of a vehicle "V".

Specifically, air filtered through an air filter 4 provided in the vehicle V is introduced to a compressor 6. Foreign matter on the environmental sensors 2 is removed by injecting air compressed by the compressor 6 onto the surfaces of the environmental sensors 2. The environmental sensors 2 may include a plurality of environmental sensors 2a, 2b, 2c. Three environmental sensors are disclosed in the drawings and the specification, but the number of the environmental sensors is not limited thereto and may be increased or decreased.

In addition, the air cleaning system 1 includes an air tank 8. The air tank 8 may be filled with air compressed by the compressor 6 or supplied by an external device, and the air filled in the air tank 8 may be used to clean the environmental sensors 2.

A controller 10 of the air cleaning system 1 is configured to operate a valve 12, e.g., a solenoid valve, at predetermined intervals or in a predetermined situation, for example, in which the environmental sensors 2 are detected as being contaminated. Thus, compressed air is injected to each of the environmental sensors 2 from the compressor 6 or the air tank 8, thereby cleaning the environmental sensors 2. The valve 12 may be provided or integrated with a distributer 14 such that compressed air is distributed through nozzles (16a, 16b, 16c, collectively 16) provided for the environmental sensors 2, respectively.

In particular, in the of a camera, a LiDAR sensor, and the like which use light, recognition performance thereof is likely to deteriorate when the sensor surface is contaminated. Thus, the present disclosure is intended to provide a cleaning apparatus that may more effectively clean such environmental sensors.

Figure 3:
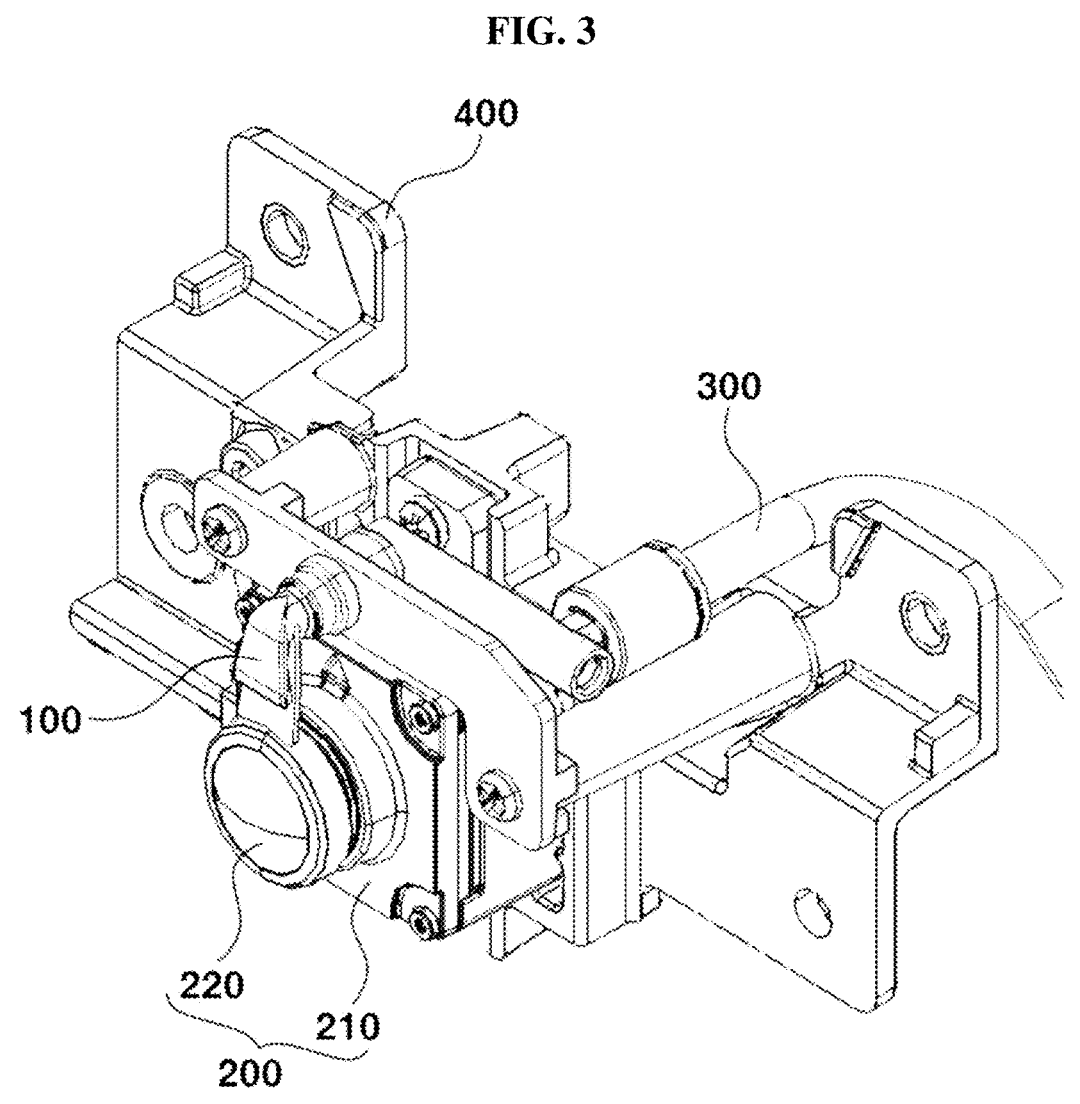

Referring to FIG. 3, the cleaning apparatus according to the present disclosure includes a nozzle 100. The nozzle 100 is configured to inject a fluid to a subject. The nozzle 100 may clean the subject by injecting the fluid to the subject. As a non-limiting example, the fluid may be compressed air supplied by the air cleaning system 1 as illustrated in FIG. 1.

In an implementation, the subject may be a radar. In another implementation, the subject may be a LiDAR sensor. In another implementation, the subject may be a camera. The camera 200 may include a body 210 and a lens 220, and the portion to be cleaned in the camera 200 may be the lens 220 of the camera 200. Hereinafter, the subject is described as being the camera 200 as an example, but it should be apparent to those having ordinary skill in the art that the cleaning apparatus according to the present disclosure may be applied to different types of environmental sensors.

A fluid is supplied to the nozzle 100. For example, the nozzle 100 is one of the nozzles 16 of the air cleaning system 1. The nozzle 100 may be supplied with the compressed air from the air cleaning system 1. The nozzle 100 may be supplied with the fluid by the air cleaning system 1 through a tube 300.

Figure 4A:
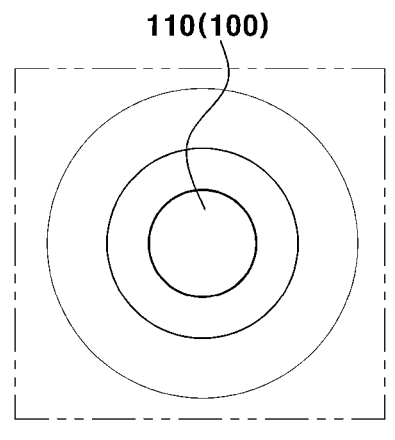
FIG. 4A illustrates a cross-section of an inlet portion of a nozzle of the cleaning apparatus according to an embodiment of the present disclosure.
Figure 4B:
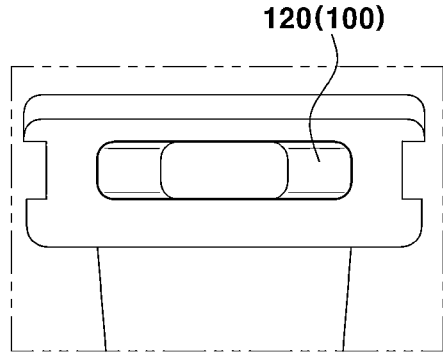
FIG. 4B illustrates a cross-section of an outlet portion of the nozzle of the cleaning apparatus according to an embodiment of the present disclosure.
Figure 4C:
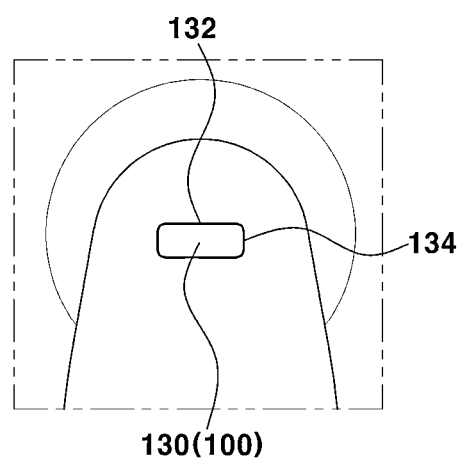
FIG. 4C illustrates a middle portion of the nozzle of the cleaning apparatus according to an embodiment of the present disclosure.

As illustrated in FIGS. 4A, 4B, and 4C, according to some embodiments of the present disclosure, the cross-section of the nozzle 100 is designed to have a predetermined shape, size, position, and the like. Due to the characteristics of the system, it is impossible to indefinitely introduce air from outside the vehicle. Therefore, the cross-section of the nozzle 100 is designed to effectively perform cleaning while reducing the amount of air used. The cross-sectional shape of the nozzle 100 is not limited to the illustration, but the nozzle 100 may have other shapes as long as design conditions to be described later are met. In addition, although the nozzle 100 is disposed above the camera 200 in the illustration, the nozzle 100 may also be located below or at a side of the camera 200. However, considering the effect of gravity or the like, the nozzle 100 may be disposed above the camera 200.

The nozzle 100 includes an inlet portion 110 and an outlet portion 120. The tube 300 may be connected to the inlet portion 110 such that compressed air may be introduced into the nozzle 100 through the inlet portion 110. The compressed air that has passed through the nozzle 100 is sprayed onto the camera 200 through the outlet portion 120. According to one embodiment of the present disclosure, the nozzle 100 may further include a middle portion 130. The middle portion 130 may connect the inlet portion 110 and the outlet portion 120. With respect to a fluid flow direction D1, the inlet portion 110 may be disposed most upstream, the middle portion 130 may be disposed downstream of the inlet portion 110, and the outlet portion 120 may be disposed downstream of the middle portion 130.

The nozzle 100 is configured such that the cross-section thereof varies in the fluid flow direction D1. In other words, the nozzle 100 is designed with a varying cross-section in the direction of fluid flow, D1. The nozzle 100 may be configured such that the cross-sectional area thereof decreases and then increases in the fluid flow direction D1. According to an implementation of the present disclosure, the cross-sectional area of the middle portion 130 is smaller than the cross-sectional area of the inlet portion 110. In addition, the cross-sectional area of the outlet portion 120 is greater than the cross-sectional area of the middle portion 130. The relationship of the size of the cross-sectional area between the inlet portion 110 and the outlet portion 120 may be determined in a certain manner. For example, the relationship of the size of the cross-section between the inlet portion 110 and the outlet portion 120 may be set differently depending on the shape of the surface of the corresponding environmental sensor 2.

Because the cross-sectional area of the middle portion 130 is smaller than the cross-sectional area of the inlet portion 110, the flow rate of fluid increases while passing through the middle portion 130. Then the fluid may clean the entire area of the lens 220 of the camera 200 while passing through the outlet portion 120, the cross-section of which is greater than the cross-section of the middle portion 130.

In some implementations, the middle portion 130 includes longer sides 132 and shorter sides 134. For example, when the nozzle 100 is disposed above or below the camera 200, the size of the longer sides 132 facing up and down is smaller than the diameter D2 of the lens 220. When the longer sides 132 are set to be greater than the diameter D2 of the lens 220, the fluid is sprayed beyond the diameter D2 of the lens 220. Since this causes unnecessary consumption of air, it is desirable that the length of each of the longer sides 132 is set to be shorter than the diameter D2 of the lens 220. Alternatively, for example, when the nozzle 100 is located at a side of the camera 200, the longer sides 132 of the middle portion 130 facing left and right are set to be shorter than the diameter D2 of the lens 220. The use of the terms "longer sides 132" and "shorter sides 134" is not intended to limit the cross-sectional shape of the middle portion 130 to a quadrangle but is intended to distinguish longer sides from shorter sides in terms of length. For example, when the middle portion 130 has an elliptical cross-sectional shape, a major axis and a minor axis may be used.

Figure 5:
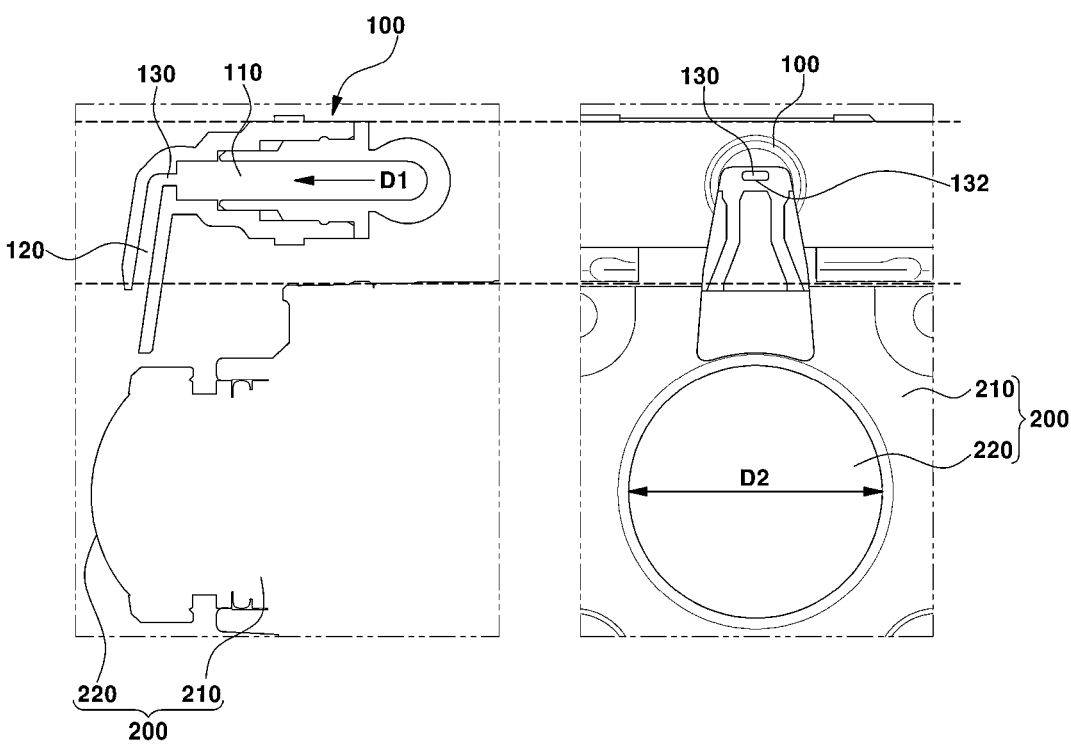
FIG. 5 illustrates a cross-sectional view and a front view of the cleaning apparatus according to an embodiment of the present disclosure.
Figure 6:
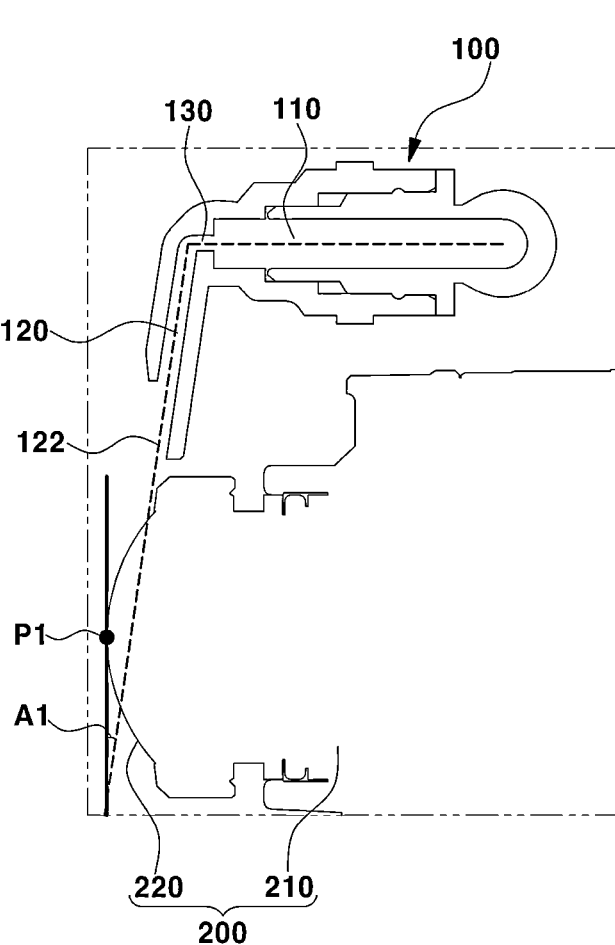
FIG. 6 illustrates a cross-section of the cleaning apparatus according to an embodiment of the present disclosure.

As illustrated in FIG. 5, the outlet portion 120 may extend at a predetermined angle with respect to the middle portion 130. In particular, the outlet portion 120 may extend toward the lens 220 of the camera 200 by changing the fluid flow direction D1. In some implementations in which the lens 220 of the camera 200 has a convex surface instead of a planar surface, the outlet portion 120 is disposed behind the lens 220 of the camera 200. An angle "A1" between a center axis 122 of the outlet portion 120 and the tangent at the peak P1 of the lens 220 that is most projecting is set to be greater than 0° (see FIG. 6). In some implementations, the angle A1 may be an acute angle less than 90°. In one embodiment, the angle A1 may be greater than 0° and be equal to or less than 30°. Here, the angle A1 refers to an angle measured from the center axis 122 to the tangent at the peak P1 in the counterclockwise direction.

The position and angle of the outlet portion 120 set as above may provide the following merits. For example, the Coanda effect may be obtained so that superior cleaning effect may be provided even when the same amount of air as in the related art is introduced. Besides, the camera may have different shapes of the angle of view depending on the camera type. Some cameras may have a wide angle of view, while some cameras may have a normal angle of view. In particular, in a camera having a wide angle of view, the nozzle may overlap the range of the angle of view, thereby causing an error in recognition performance of the camera. However, according to the present disclosure, the predetermined position of the outlet portion 120 may prevent this problem.

The cleaning apparatus may further include a bracket 400. The bracket 400 allows the camera 200 to be mounted on a mounting object, such as the vehicle V. For example, when the camera 200 may not be directly fastened to the mounting object, the camera 200 may be mounted on the bracket 400 and then indirectly mounted on the vehicle V.

According to one embodiment of the present disclosure, the nozzle 100 configured to clean the lens 220 by injecting a fluid is disposed around the lens 220 of the nozzle 100. In some implementations, the nozzle 100 is mounted on the bracket 400, and thus a predetermined distance between the nozzle 100 and the lens 220 may be maintained at all times.

As a result of analysis of cleaning performance of the cleaning apparatus according to the present disclosure, it was determined that higher cleaning performance was obtained due to the angle A1 of the nozzle 100.

It was determined residual water remaining on the surface of the camera lens was more rapidly removed when the angle A1 of the nozzle 100 is acute compared to when the angle A1 of the nozzle 100 is obtuse. In the latter case, it was observed that residual water still remained even 0.17 seconds after injection of compressed air, whereas residual water was completely removed 0.17 seconds after injection of compressed air in the former case. It was also found that residual water was more rapidly removed from the initial stage of injection according to the present disclosure.

As set forth above, according to the present disclosure, it is possible to effectively clean environmental sensors.

Although the embodiments of the present disclosure have been described for illustrative purposes, those having ordinary skill in the art would appreciate that various modifications, additions, and substitutions are possible, without departing from the scope and spirit of the present disclosure.

What is claimed is:
1. A cleaning apparatus comprising a nozzle configured to receive a fluid and inject the fluid to a subject,
    wherein a cross-section of the nozzle changes in a flow direction of the fluid, wherein the nozzle comprises:

an inlet portion through which the fluid is introduced;

an outlet portion provided downstream of the inlet portion in the flow direction of the fluid such that the fluid introduced through the inlet portion is injected through the outlet portion; and a middle portion provided between the inlet portion and the outlet portion, and wherein a cross-section of the middle portion and a cross-section of the outlet portion are arranged to have an angle with respect to each other.

2. The cleaning apparatus according to claim 1, wherein a cross-sectional area of the middle portion is smaller than either a cross-sectional area of the inlet portion or a cross-sectional area of the outlet portion.

3. The cleaning apparatus according to claim 1, wherein a cross-sectional area of the nozzle decreases at the middle portion to be smaller than the cross-sectional area of the inlet portion and increases at the outlet portion to be greater than the cross-sectional area of the middle portion.

4. The cleaning apparatus according to claim 1, wherein the outlet portion extends from the middle portion at an acute angle with respect to the cross-section of the middle portion.

5. The cleaning apparatus according to claim 1, wherein the fluid is compressed air.

6. The cleaning apparatus according to claim 1, further comprising a tube connected to the nozzle to supply the fluid to the nozzle.

7. A sensor comprising:

a cleaning apparatus including a nozzle configured to receive a fluid and inject the fluid to the sensor, wherein the nozzle is configured to inject the fluid at a position behind a sensing surface of the sensor, wherein the sensing surface is convex.

8. The sensor according to claim 7, wherein the nozzle is slanted toward the sensing surface.

9. The sensor according to claim 7, wherein an angle between a center axis of the nozzle and a tangent at a peak of the sensing surface is in a range of 0° to 30°.

10. The sensor according to claim 7, wherein the sensor is one selected from among a camera, a LiDAR sensor, and a radar.

11. The sensor according to claim 7, wherein a cross-section of the nozzle changes in a flow direction of the fluid.

12. The sensor according to claim 7, further comprising a bracket configured to mount the sensor to a vehicle.

13. The sensor according to claim 7, further comprising a tube configured to supply the fluid to the nozzle.

14. The sensor according to claim 7, wherein the fluid is supplied by an air cleaning system provided in a vehicle.

15. The sensor according to claim 9, wherein the angle is measured in a counterclockwise direction from the center axis to the tangent.

16. The sensor according to claim 7, wherein the nozzle comprises:

an inlet portion through which the fluid is introduced;

an outlet portion provided downstream of the inlet portion in a flow direction of the fluid such that the fluid introduced through the inlet portion is injected through the outlet portion; and a middle portion provided between the inlet portion and the outlet portion, wherein a cross-section of the middle portion and a cross-section of the outlet portion are arranged to have an angle with respect to each other.

17. The sensor according to claim 16, wherein the cross-section of the middle portion is defined by longer sides and shorter sides shorter than the longer sides, wherein a length of the longer sides is smaller than a diameter of sensing surface.

18. The sensor according to claim 16, wherein a cross-sectional area of the middle portion is smaller than either a cross-sectional area of the inlet portion or a cross-sectional area of the outlet portion.

19. The sensor according to claim 16, wherein the outlet portion extends from the middle portion at an acute angle with respect to the cross-section of the middle portion.

* * * * *